Figure 1:
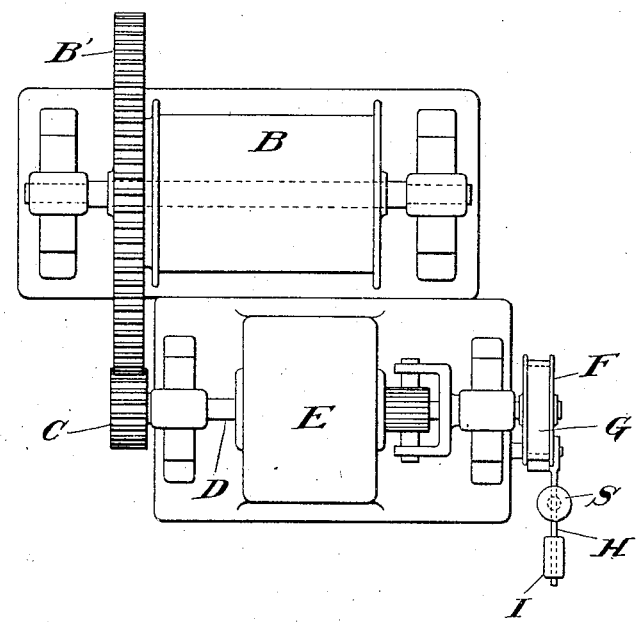

No. 786,323. PATENTED APR. 4, 1905.
W. D. STIVERS.
ELECTRIC MOTOR CONTROL.
APPLICATION FILED NOV. 12, 1904.

4 SHEETS—SHEET 1.

Witnesses:
Chas. D. King
A. N. Jesbera

Inventor:
William D. Stivers
by Redding, Kiddle & Greeley
Attys.

No. 786,323. PATENTED APR. 4, 1905.
W. D. STIVERS.
ELECTRIC MOTOR CONTROL.
APPLICATION FILED NOV. 12, 1904.

4 SHEETS—SHEET 3.

Witnesses:
Chas. D. King
A. N. Jesbera

Inventor:
William D. Stivers
by Redding, Kiddle & Greeley
Attys.

No. 786,323. PATENTED APR. 4, 1905.
W. D. STIVERS.
ELECTRIC MOTOR CONTROL.
APPLICATION FILED NOV. 12, 1904.

4 SHEETS—SHEET 4.

Witnesses:
Chas. D. King
N. N. Jesbera

Inventor:
William D. Stivers
by Redding, Kiddle & Greeley
Attys.

No. 786,323.

Patented April 4, 1905.

UNITED STATES PATENT OFFICE.

WILLIAM D. STIVERS, OF JERSEY CITY, NEW JERSEY, ASSIGNOR TO C. W. HUNT COMPANY, OF WEST NEW BRIGHTON, NEW YORK, A CORPORATION OF NEW YORK.

ELECTRIC-MOTOR CONTROL.

SPECIFICATION forming part of Letters Patent No. 786,323, dated April 4, 1905.

Application filed November 12, 1904. Serial No. 232,477.

*To all whom it may concern:*

Be it known that I, WILLIAM D. STIVERS, a citizen of the United States, residing in the city of Jersey City, in the county of Hudson, in the State of New Jersey, have invented certain new and useful Improvements in Electric-Motor Control, of which the following is a specification, reference being had to the accompanying drawings, forming a part hereof.

The object of this invention is to provide simple, reliable, and efficient means for the control of electric motors, especially of such motors when employed under conditions which at times require the motor or the part driven by it to run backward under the stress of a load which must be opposed more or less, as in the case of motors employed for the operation of hoisting-engines, in which provision must be made for the lowering of the load under control. In such cases it has been usual heretofore to control the descent of the load by mechanical braking devices, which in some cases must be operated independently of the motor-controller, and therefore divide the attention of the operator.

By the present invention not only is the forward movement of the motor placed under the absolute control of the operator through the movement of an ordinary controller-lever, but the lowering of the load is likewise placed under the absolute control of the operator through the movement of the same controller lever or handle. Furthermore, the controlling devices are so arranged as to permit no sudden drop of the load and to require in their operation no current of such high voltage as to be dangerous to the mechanism, but to provide for instantaneous effect with current of relatively low voltage.

In accordance with the invention provision is made whereby in the lowering of the load upon operation of the controller the armature of the motor is short-circuited upon itself, preferably through a suitable resistance, the field-coils being supplied with current from the mains, and an electrical braking effect is thereby produced through the backward rotation of the armature under the stress of the load.

Provision is also made for the relative variation of the resistance in the field-circuit and the resistance in the armature short-circuit, whereby the braking effect can be controlled as required for different weights and different speeds of the descending load.

Provision is also made for positively overhauling the motor when under the conditions referred to there is no load or the load is insufficient to overhaul the hoisting-drum.

The several features of the invention will be more fully explained hereinafter with reference to the accompanying drawings, in which the invention is illustrated as applied to a series-wound motor, although it will be understood that it is also capable of application to a shunt-wound motor and to a compound-wound motor.

Figure 2:
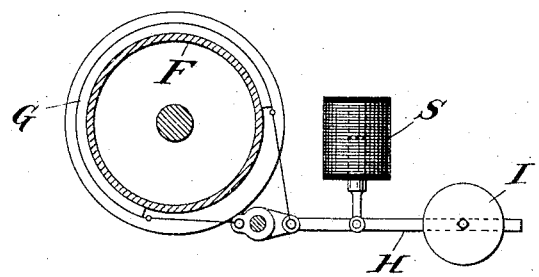
Figure 3:
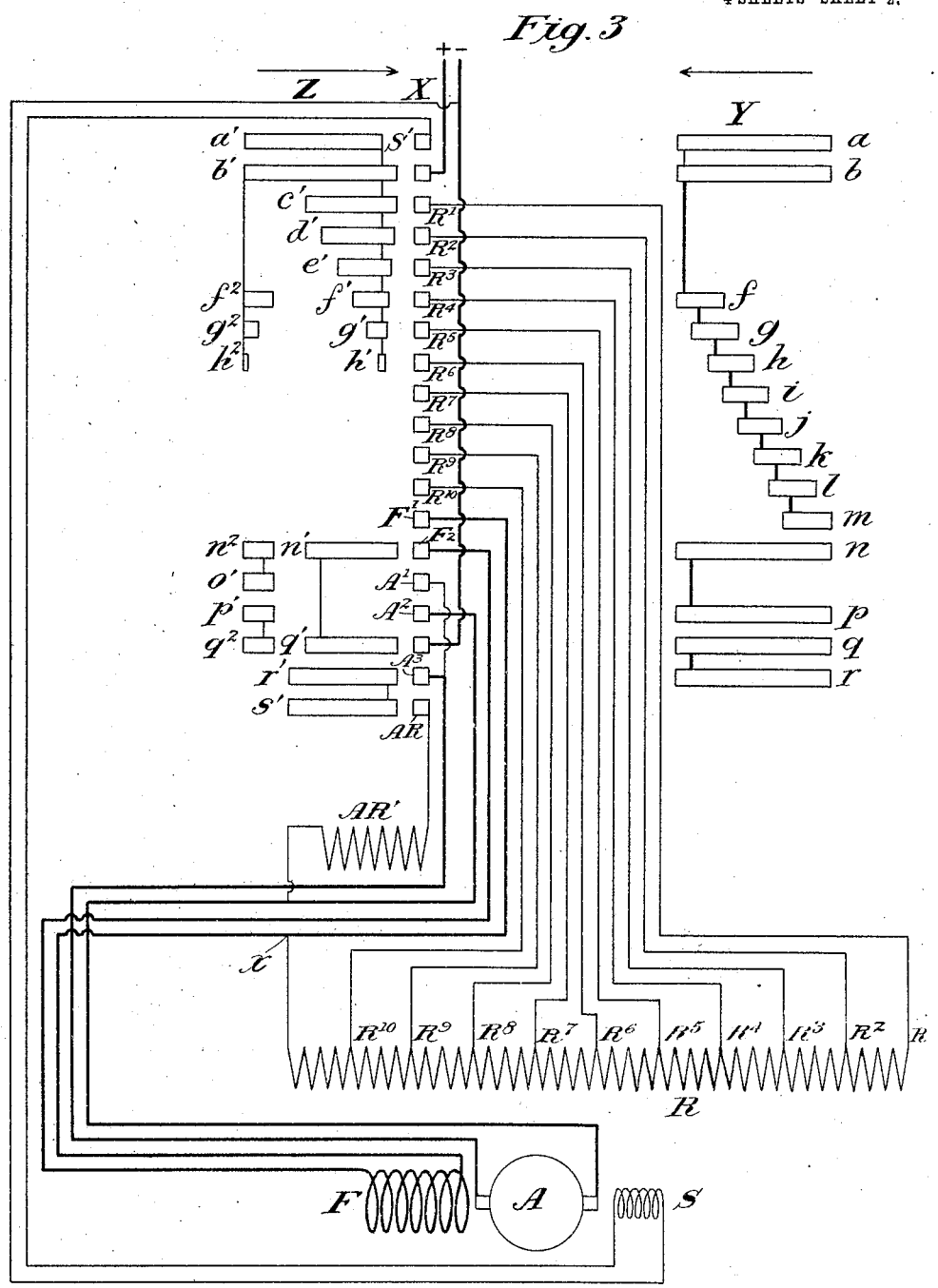
Figure 4:
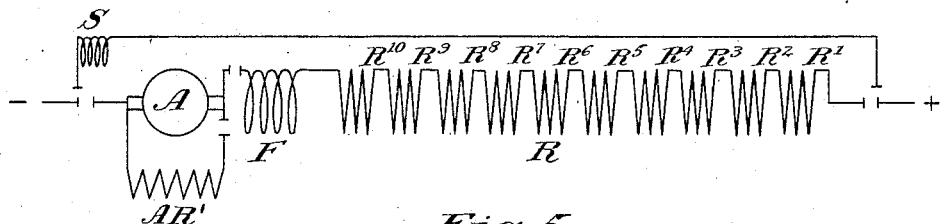
Figure 5:
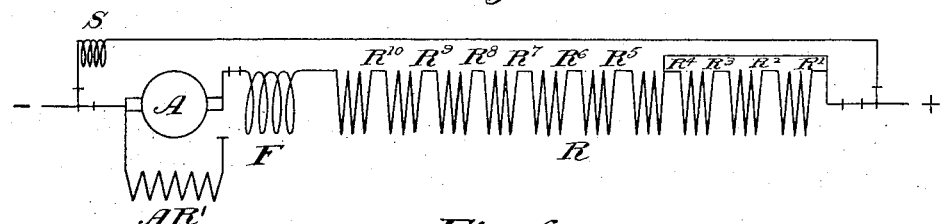
Figure 6:
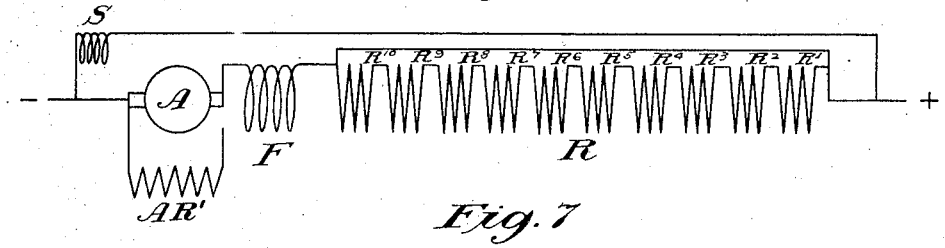
Figure 7:
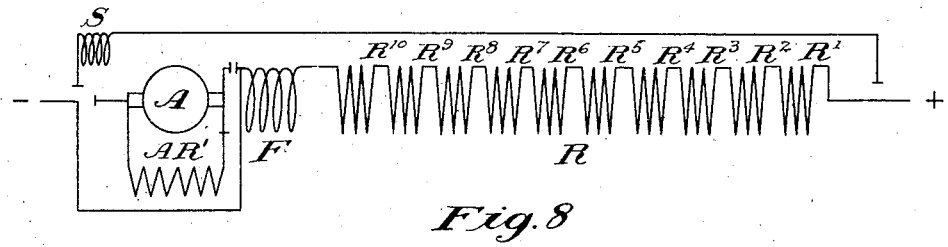
Figure 8:
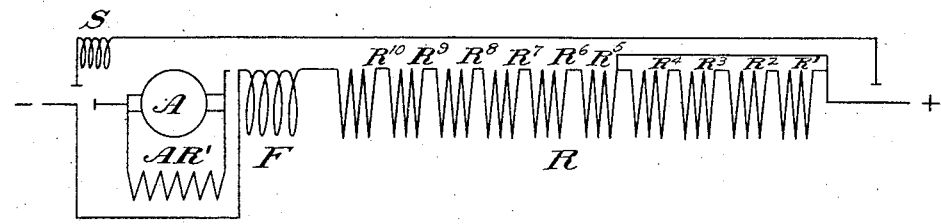
Figure 9:
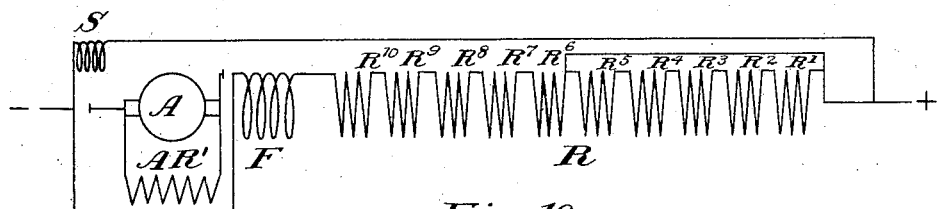
Figure 10:
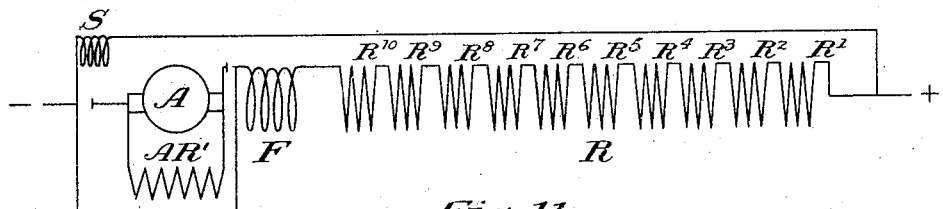
Figure 11:
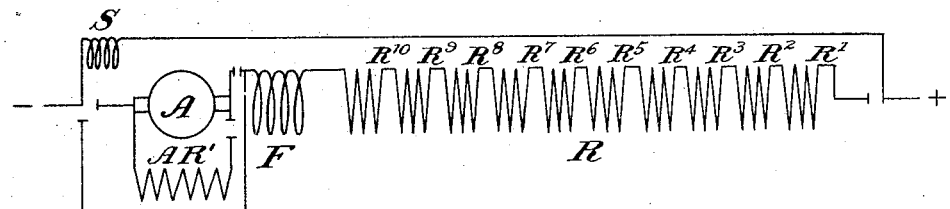
Figure 12:
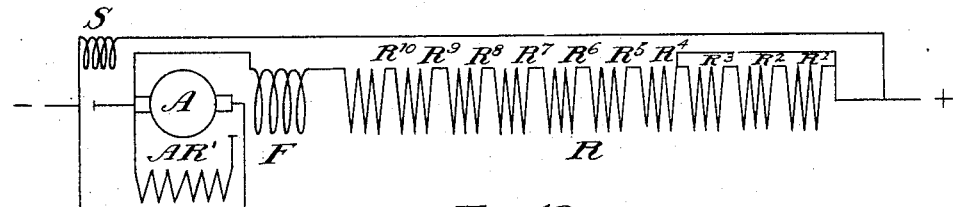
Figure 13:
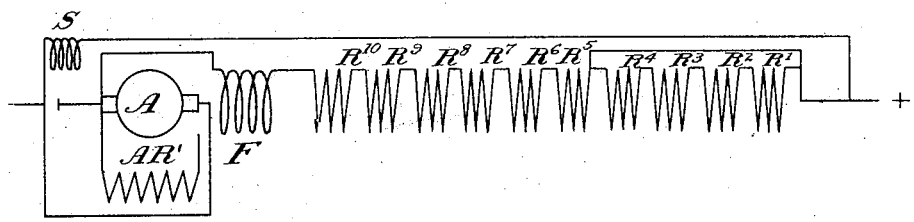

In the drawings, Figure 1 is a plan view of a hoisting-engine to which the invention is applied, such engine being shown as having a single winding-drum. Fig. 2 is a detail view showing the electrically-controlled mechanical brake. Fig. 3 is a general diagrammatic view illustrating the connections of the controller and the motor and brake. Fig. 4 is a detail diagrammatic view illustrating the connections of the motor and the brake when the engine is at rest without load. Fig. 5 is a similar view showing the connections with a portion of the resistance in the field-circuit cut out. Fig. 6 is a view similar to Fig. 4, but showing all of the resistance in the field-circuit cut out. Fig. 7 is a similar view showing the connections in the first position of the controller to develop an electrical braking effect in opposition to the stress of the load. Fig. 8 is a view similar to Fig. 6, but with a portion of the resistance in the field-circuit cut out. Fig. 9 is a view similar to Fig. 6, but with more of the resistance in the field-circuit cut out and with the circuit of the electrically-controlled mechanical brake closed to relieve the brake. Fig. 10 is a view similar to Fig. 8, but with none of the resistance cut out. Fig. 11 is a similar view illustrating the connections when the load is at its minimum with both the electrical brake and the electrically-controlled mechanical brake off. Fig. 12 is a similar view, but illustrating the connections when current is supplied to the armature in a reverse direction for the purpose of overhauling the motor when there is no load. Fig. 13 is a view similar to Fig. 11, but with more of the resistance in the field-circuit cut out.

The particular character of the apparatus to which the motor is applied is immaterial so far as the present invention is concerned; but in order that the application of the invention may be the more readily understood there is shown in Figs. 1 and 2 of the drawings a hoisting-engine of ordinary character. As represented, it comprises a hoisting-drum B, suitably mounted and provided with a gear B', which is engaged by a pinion C on the armature-shaft D of the motor E. There may also be secured to the armature-shaft D a brake-drum F, having applied thereto a strap brake G, actuated by a weighted lever H to normally set the brake. The action of the weight I, however, is opposed to a solenoid S, which is connected as explained hereinafter, whereby when the solenoid is energized the brake is thrown off and when the circuit of the solenoid is broken the brake is applied. It is preferable that this mechanical brake should be employed in addition to the electrical brake hereinafter described, and it is also preferable that this mechanical brake be electrically controlled, as herein explained, although it will be obvious that without affecting the other features of the invention, the mechanical brake might be mechanically controlled by a suitable hand or foot lever or handle.

As hereinbefore stated, the invention is illustrated in the accompanying drawings and is explained herein as applied to a series-wound motor. Such a motor and the connections to the various parts thereof which are effected by the controller, together with the connections to the solenoid which controls the mechanical brake, are represented in Fig. 3 of the drawings. The controller, which is represented diagrammatically in Fig. 3, is conveniently arranged with reference to the arrangement of the motor, also therein represented, and obviously will be arranged in each case in accordance with the special requirements thereof. It comprises a series X of fixed contacts, a series Y of contacts mounted upon the movable barrel of the controller to effect the necessary connections in hoisting, and a series Z of contacts likewise mounted upon the movable barrel of the controller to effect the connections in lowering the load or in otherwise permitting the operation of the motor either under stress of the load in lowering or in overhauling. The series of stationary contacts includes contacts + and − for connection to the main line, a contact S' for one branch of the circuit through the solenoid S, the other branch of such circuit being connected directly to one side of the main line, a series of contacts $R'$ to $R^{10}$, connected to different points in the resistance R, contacts F' and $F^2$ for the terminals of the field F, contacts A' and $A^2$ for the terminals of the armature A, a second contact $A^3$, also connected to the armature-circuit, and a contact A R, which is connected with one leg of the armature-circuit through a resistance A R'. One end of the motor and field resistance R may be connected to the first resistance-contact R', while the other end of such resistance is connected to one leg of the field-circuit, as at $x$. During the operation of the motor in hoisting or in running ahead for any other purpose the branch circuit, which includes the armature-resistance A R', is open, while the armature, the field F, and the field resistance R are included in series. The contacts R' to $R^{10}$ are provided in the present instance for the purpose of varying the amount of resistance R to be included in series with the field F, the ultimate purpose being to effect change in the relative proportions of the current in the field and the current in the armature. It will be readily understood that this relative change might be effected by varying the armature resistance A R'; but for convenience in illustration the arrangement is herein shown as already described, in which the desired result is produced by varying the field resistance.

In order that the particular embodiment of the invention, which is illustrated herein, may be clearly understood, the connections in some of the various positions of the controller, both in hoisting and in lowering or in other corresponding conditions, will now be described briefly.

When the apparatus is at rest with the controller-handle in central position, none of the contacts of the movable series Y or of the movable series X rests upon any of the contacts of the stationary series X, so that, as indicated in Fig. 3, the circuits of the solenoid S and the field F and armature A and the short circuit of the armature are all open. Under these conditions, the solenoid S not being energized, the mechanical brake is set and all parts are held stationary. If now it be desired to raise the load or to perform any other equivalent operation, the controller-handle is moved to the left to the first position. Through the contacts $ab$, which are connected, the circuit is closed through the solenoid S, and the mechanical brake is thus relieved. At the same time, through the contact $f$, which is also connected to the long contact $b$, current flows from the contact $R^4$ to the corresponding point of the resistance R through the resistance to the point $x$, thence through the field F and back to the contact $F^2$, thence, by the contacts $n$ and $p$, which are connected to the contact $A^2$, through the armature A and back to the contacts $A^3$, from which connection is made to the negative side of the main line through the contacts $r$ and $q$. The connections as thus established are represented in Fig. 5. As the controller-handle is moved farther toward the left more of the resistance R is cut out through the stepped arrangement of the contacts F G H, &c., until, as shown in Fig. 6, the entire field resistance is cut out. During these successive movements of the controller-handle to the left the current supplied to the motor is gradually increased and the speed of the motor is accelerated until the maximum is attained. If the handle of the controller is moved from its extreme left-hand position toward the right, the current supplied to the motor is gradually reduced and the speed of the motor is likewise gradually reduced until when the handle reaches the initial position all current is cut off and the solenoid-brake is again applied, all as represented in Fig. 4, the apparatus being thus held stationary by the brake while the motor is without current.

If it be desired to lower the load or to perform any other equivalent operation, the controller-handle is moved toward the right from the position indicated in Fig. 3. As indicated in Fig. 7, the effect of this movement is to complete the circuit through the field and the entire field resistance and to short-circuit the armature on itself and its resistance A R'. The solenoid at this time continues to be deprived of current, as in the initial position, thereby leaving the mechanical brake set. The contacts $c'$ $d'$, &c., are set successively to the rear, but in a slight degree, so that during the first movement of the controller-handle the amount of the field resistance is gradually reduced until, as represented in Fig. 9, the resistance has been reduced to an amount which is sufficient to give the full field strength. As the controller-lever reaches its second position, the field resistance having been reduced, as described, the circuit of the brake-solenoid S is completed, so that the brake is released. The load then begins to turn the hoisting-drum, and consequently the armature, backward, whereby there is generated an independent current in the closed circuit of the armature and its resistance in opposition to that supplied by the mains, the speed of rotation of the armature, and consequently the current generated, being in proportion to the load. The energy of the load is thus converted into current which is dissipated as radiated heat in the resistance A R'. The contacts $c'$ $d'$, &c., are successively shorter, as shown in Fig. 3, so that as the controller-lever is moved farther toward the left the resistance R is increased until the maximum resistance is included, as represented in Fig. 10, whereby the field strength is reduced and the armature is permitted to revolve successively faster with the same load or to commence to revolve with a lighter load until in the position indicated in Fig. 11 the maximum speed of the armature is attained, the circuit through the field and its resistance and the short circuit of the armature being then open, while the circuit of the brake-solenoid still remains closed and the brake off, so that the armature is then free to revolve under the stress of the load without any electrical or mechanical braking resistance. If then the load is not sufficient to overhaul the motor or if there is no load and it is desired to pay out the hoisting-rope, the armature should be rotated backward. For this purpose the controller-lever is moved to the next position, (represented by Fig. 12,) in which the armature is included in series with the field and a portion of the field resistance, but with the direction of current through the armature reversed, so that the armature is then caused to revolve in the backward direction. Further movement of the lever cuts out more of the resistance R and gives higher speed to the backward rotation of the armature. Upon moving the controller-lever toward the left from its extreme right-hand position toward its zero or initial position the speed of backward rotation of the armature will be reduced, the armature will then be left free, and the braking resistance or retarding effect will be created and increased until the speed of the armature is brought down to any desired degree, and finally the rotation of the armature is stopped altogether and the circuit of the brake-solenoid is open and the mechanical brake again applied. The gradual reduction and increase of the resistance in the field through the arrangement of the contacts $c'$ $d'$, &c., increases and reduces the current gradually, minimizing the danger of arcing and burning.

The application of the invention to other forms of motors and to other uses than that herein particularly referred to will be apparent to those skilled in the art, and it is to be understood, therefore, that the invention is not limited to the particular arrangement shown and described herein.

I claim as my invention—

1. The combination with a motor, of a controller, means actuated by said controller to regulate the driving ahead of the motor and means actuated by said controller to impose the maximum dynamical braking resistance to the movement of the motor in backward rotation upon the movement of the controller to the first point for backward running, to gradually decrease such resistance to zero by further movement of the controller, and upon still further movement of the controller to supply current for the backward rotation of the motor and to regulate its speed.

2. The combination with a motor, of means to short-circuit the armature upon a separate circuit, a controller and connections to regulate the speed of the motor, a mechanical brake for said motor and electrical devices in connection with said controller to control the application of said brake, said devices including means to successfully decrease the resistance in the field-circuit to bring the field to its maximum strength for dynamic braking effect with the armature short-circuited on a separate circuit before the mechanical brake is released for the motor to be driven backward.

3. The combination with a hoisting-drum and a motor therefor, of a controller for said motor, said controller comprising a series of fixed contacts and connections to the armature, field and field resistances of the motor, a movable series of contacts to coöperate with said fixed contacts in controlling the speed of the motor, and a second movable series of contacts to coöperate with said fixed contacts in controlling the resistance offered by the motor to backward rotation under stress of the load.

4. The combination with a hoisting-drum and a motor therefor, of a resistance in a normally open separate circuit with the armature, and a controller comprising a fixed series of contacts and connections to the armature, field, field resistances and said armature resistance, a movable series of contacts coöperating with said fixed series of contacts to control the speed of the motor in hoisting, and a second movable series of contacts to coöperate with said fixed series of contacts to short-circuit the armature in a separate circuit with said armature resistance and to vary the resistance in the field-circuit with respect to the resistance in the armature-circuit.

5. The combination with a hoisting-drum and a motor therefor, of a resistance in a normally open separate circuit with the armature, and a controller comprising a fixed series of contacts and connections to the armature, field, field resistances and said armature resistance, a movable series of contacts coöperating with said fixed series of contacts to control the speed of the motor in hoisting, and a second movable series of contacts to coöperate with said fixed series of contacts to short-circuit the armature in a separate circuit with said armature resistance and to vary the resistance in the armature-circuit and also to control the speed of driving in the reverse direction.

This specification signed and witnessed this 7th day of November, A. D. 1904.

WILLIAM D. STIVERS.

In presence of—
ANTHONY N. JESBERA,
W. B. GREELEY.